F. G. SMITH.
INDICATOR.
APPLICATION FILED JULY 5, 1918.
1,301,516.
Patented Apr. 22, 1919.
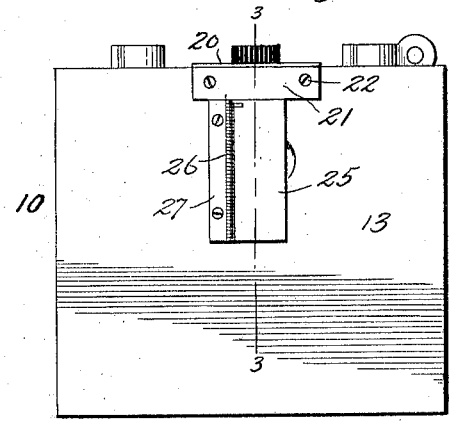
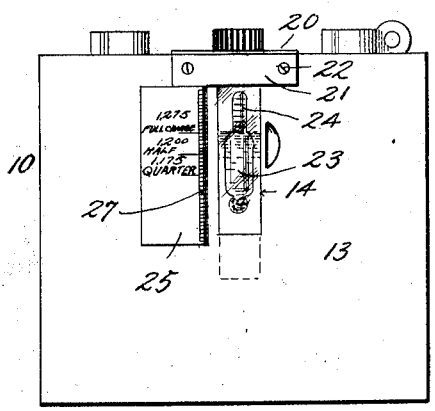
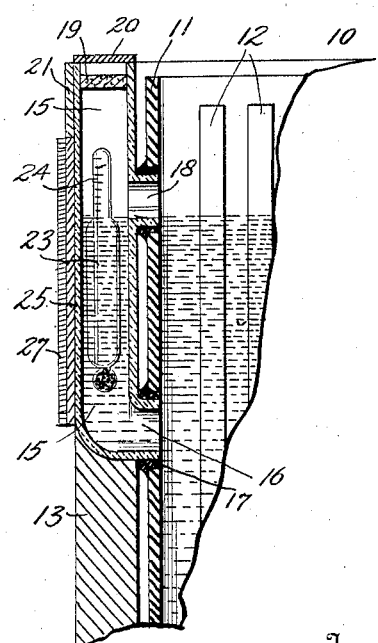
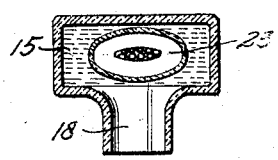
WITNESSES
Inventor
Franklin G. Smith
Attorney

UNITED STATES PATENT OFFICE.

FRANKLIN G. SMITH, OF CIRCLEVILLE, NEW YORK.

INDICATOR.

1,301,516.  Specification of Letters Patent.  Patented Apr. 22, 1919.

Application filed July 5, 1918. Serial No. 243,411.

*To all whom it may concern:*

Be it known that I, FRANKLIN GERALD SMITH, a citizen of the United States, residing at Circleville, in the county of Orange and State of New York, have invented certain new and useful Improvements in Indicators, of which the following is a specification.

This invention relates to measuring instruments and particularly to hydrometers, the object being to provide means for carrying a hydrometer within a suitable receptacle attached to a storage battery for the purpose of indicating the condition of the electrolyte within the battery, the arrangement being such that the hydrometer will always be ready and convenient for hasty inspection and will at all times show the conditions of the battery by indicating the height of the electrolyte therein and its specific gravity. The receptacle holding the hydrometer being mounted within the outer casing of the battery within an opening in one of the walls thereof is protected from injury and is in position to be quickly inspected. The construction is simple and cheap to manufacture and apply and does not project beyond the outer surface of the battery case and so does not mar the appearance of the battery nor interfere with the close packing of batteries when more than one are to be used in conjunction. Furthermore, by mounting the hydrometer in the wall of the casing of the battery, it can not be misplaced, is ready for instant inspection and saves time and trouble in ascertaining the condition of the electrolyte.

With these objects in view, together with others which will appear as the description proceeds, the invention resides in the novel formation, combination and arrangement of parts, all as will be described more fully hereinafter, particularly pointed out in the claims, and illustrated in the accompanying drawings, in which:

Figure 1 is an elevation of one side of a storage battery provided with the improved hydrometer.

Fig. 2 is a similar view with the door covering the hydrometer open to expose the same and the scale of reading on the inner side of the door.

Fig. 3 is an enlarged vertical sectional view on the line 3—3 of Fig. 1, and

Fig. 4 is a transverse sectional view of the hydrometer receptacle and hydrometer removed from the battery casing.

In the drawings, 10 indicates the outer casing of the storage battery within which is a cell 11 of the battery containing the battery plates 12 and the electrolyte, the same being of well known construction and need no further description.

In one of the side walls as 13 is formed a cavity 14 extending downwardly for a suitable distance from the top of the casing 10. Within this cavity is placed a tubular receptacle 15 open at the top at or near the top of the casing 10 and having a laterally projecting neck 16 extending from the bottom inwardly and through the adjacent side of the cell 11, being secured in said cell by cement or other substance 17 to prevent leakage of the electrolyte around the neck. Between the neck 16 and the top of the receptacle 15 is a tubular extension 18 parallel with the neck and opening into the receptacle and also into the cell 11, being secured in the cell by cement in a manner similar to the neck 16. As thus, constructed, the electrolyte in the battery cell will flow through the neck 16 into the receptacle 15 and will at all times stand at the same height therein as in the cell 11. Preferably the tubular extension 18 will be situated at substantially the level of the electrolyte, to permit ready circulation of the electrolyte.

The open upper end of the receptacle 15 is provided with a closure 19 of any suitable character over which is placed a plate 20 which extends across the cavity 14 in the wall of the cell 10 and is secured to said wall by means of screws. A second plate 21 extends across the outside of the receptacle 15 at the top and is similarly secured to the cell by screws 22. By means of these plates, the receptacle 15 is maintained in position within the cavity 14.

Within the receptacle 15 is placed a hydrometer 23 of known design having an upwardly projecting stem 24 provided with graduations. Preferably the body of the hydrometer is made of elliptical form in cross section as shown in Fig. 4 to provide a float of suitable size and to enable it to move readily within the receptacle 15, which is also made elongated in cross section as shown in said figures, without spinning and so keeping its scale always in view.

The receptacle 15, which is made of glass or other transparent material is mounted in the cavity 14 with its outer side in substantially the same plane as the outer face of the side 13 of casing 10, so that the hydrometer 23 may be seen through the cavity 14, but to prevent injury to the receptacle and hydrometer, the exposed portion of said receptacle is normally covered by a door 25 hinged to the casing 10 and maintained in position to cover the cavity 14 by a spring 26 encircling the pin of the door hinge 27. On the inner side of the door 25 is a scale indicating the specific gravity of the electrolyte and the quantity within the cell 11, that is to say whether a full charge, a half charge or a quarter charge.

A storage battery provided with a hydrometer of the present invention is prepared at all times to indicate instantly the condition of the electrolyte, it only being necessary to swing the door 25 from the position shown in Fig. 1 to that represented in Fig. 2, thus exposing to view the hydrometer 23, which, floating in the electrolyte in the receptacle 15, marks by its position with respect to the scale on the inside of the door 25, the height of the electrolyte in the cell 11 and its specific gravity, thus indicating the condition of the battery.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:

1. The combination with a casing containing a cell for holding liquid and having a cavity in one wall, of a receptacle for a hydrometer seated in said cavity and opening into the cell at its lower end, said receptacle having a transparent outer wall substantially flush with the outer surface of the casing through which wall the hydrometer may be seen, and a closure hinged to said casing for covering said wall to protect the same.

2. The combination with a casing containing a cell for holding liquid and having a cavity in one wall, of a receptacle for a hydrometer seated in said cavity and connected to said cell at its lower end and also at a higher point coincident with the level of the fluid, said receptacle having a transparent outer wall substantially in the plane of the outer surface of the casing through which the hydrometer may be seen, and a hinged cover for protecting the receptacle having a scale on its inner side to indicate in connection with the position of the hydrometer the condition of the liquid.

3. In combination with a casing having a cavity in one side thereof extending downwardly from the top, and a battery cell within the casing, of a vitreous receptacle for a hydrometer seated within said cavity and connected with said cell at its lower end and also at a point in a higher plane, and a door hinged to said casing normally covering the exposed side of the receptacle to prevent injury thereto, said door having a scale on its inner side by means of which the position of the hydrometer may be read.

In testimony whereof I affix my signature in presence of two witnesses.

FRANKLIN G. SMITH.

Witnesses:
 FRANKLIN H. SMITH,
 FRANKLIN H. SMITH, Jr.

Copies of this patent may be obtained for five cents each, by addressing the "Commissioner of Patents, Washington, D. C."